United States Patent
Sasaki et al.

(10) Patent No.: US 6,520,276 B2
(45) Date of Patent: Feb. 18, 2003

(54) VEHICLE HOOD APPARATUS

(75) Inventors: Sakae Sasaki, Wako (JP); Kaoru Nagatomi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/907,226

(22) Filed: Jul. 17, 2001

(65) Prior Publication Data
US 2002/0011372 A1 Jan. 31, 2002

(30) Foreign Application Priority Data

| Jul. 19, 2000 | (JP) | 2000-219324 |
| Jul. 19, 2000 | (JP) | 2000-219376 |
| Jul. 19, 2000 | (JP) | 2000-219474 |

(51) Int. Cl.⁷ .............................. B60R 21/34
(52) U.S. Cl. ................... 180/274; 180/69.21
(58) Field of Search ................. 180/69.21, 274, 180/281; 296/194, 189; 60/635; B60R 21/34

(56) References Cited

U.S. PATENT DOCUMENTS

| 6,217,108 B1 | 4/2001 | Sasaki |
| 6,257,657 B1 | 7/2001 | Sasaki |
| 6,364,402 B1 * | 4/2002 | Sasaki ........................ 296/194 |

FOREIGN PATENT DOCUMENTS

| DE | 694 00 889 | 3/1997 |
| DE | 19712961 A1 * | 10/1998 |
| DE | 100 33 148 | 3/2001 |
| DE | 100 35 105 | 6/2001 |
| EP | 0 630 801 | 11/1996 |
| EP | 0 926 018 A1 * | 6/1999 |
| JP | 04081369 A * | 3/1992 |
| JP | 09315266 | 12/1997 |
| JP | 10-258774 | 9/1998 |
| JP | 10258774 | 9/1998 |
| JP | 11-310157 | 9/1999 |
| JP | 11-348716 A * | 12/1999 |

* cited by examiner

Primary Examiner—Paul N. Dickson
Assistant Examiner—Ruth Ilan
(74) Attorney, Agent, or Firm—Merchant & Gould P.C.

(57) ABSTRACT

A vehicle hood apparatus having an actuator for lifting a vehicle hood upon collision of an object with a vehicle. The actuator has an actuator block defining a cylinder therein. A locking member is urged to project into the cylinder. Upon such collision, a gas generator is operated to generate gas to raise a piston pin rapidly to lift the hood, whereupon the locking member projects into the cylinder to lock the piston pin in its raised position and hold the hood at its lifted position. As the locking member is included in the actuator, the piston pin does not have its locked position affected by the quality of work done for attaching the actuator to the vehicle body, as opposed to the case where it has to be locked to the vehicle body. As the locking and elastic members are held in the actuator block, the actuator is easier to assemble than when they have to be held on the piston pin.

2 Claims, 16 Drawing Sheets

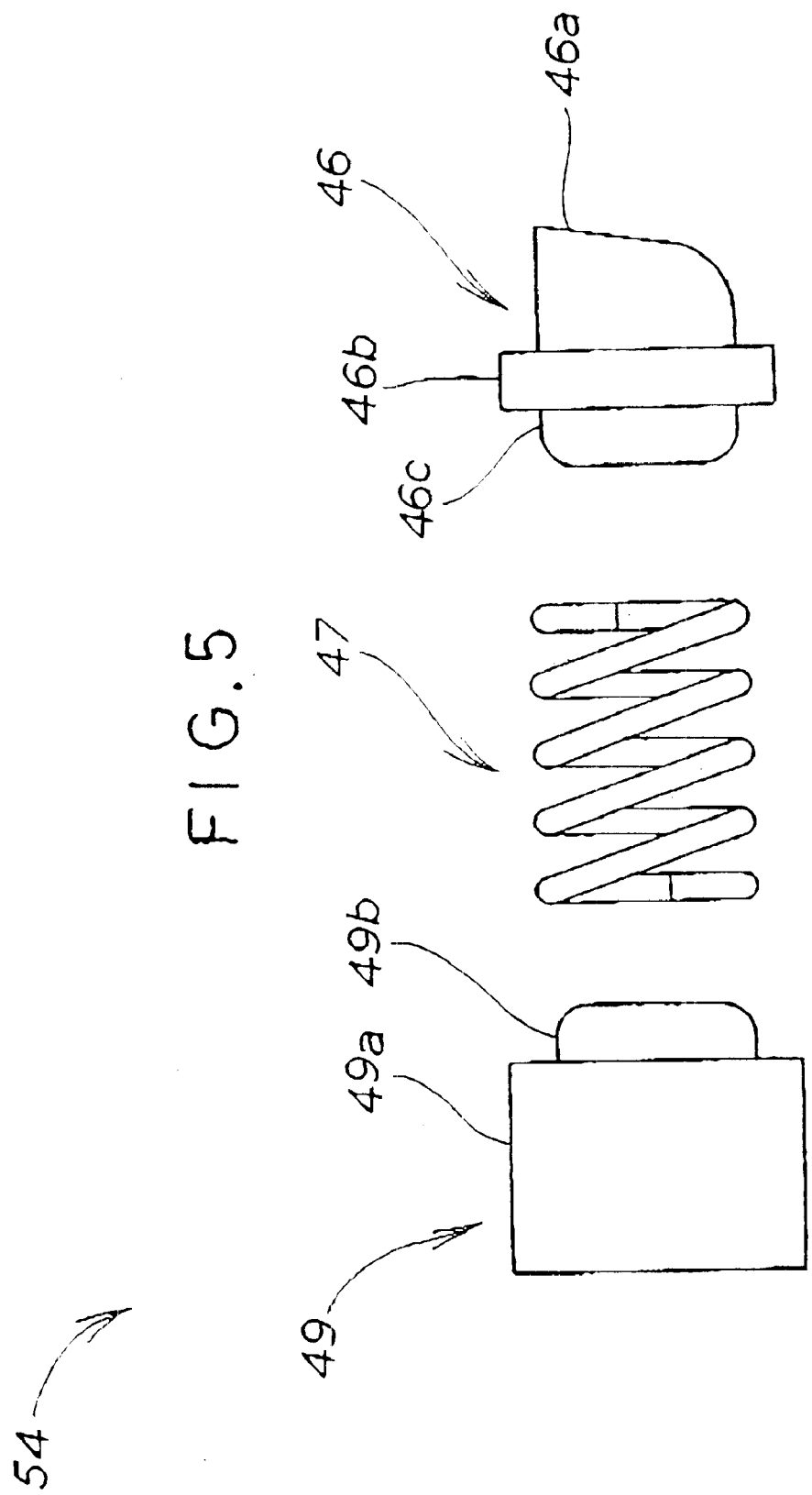

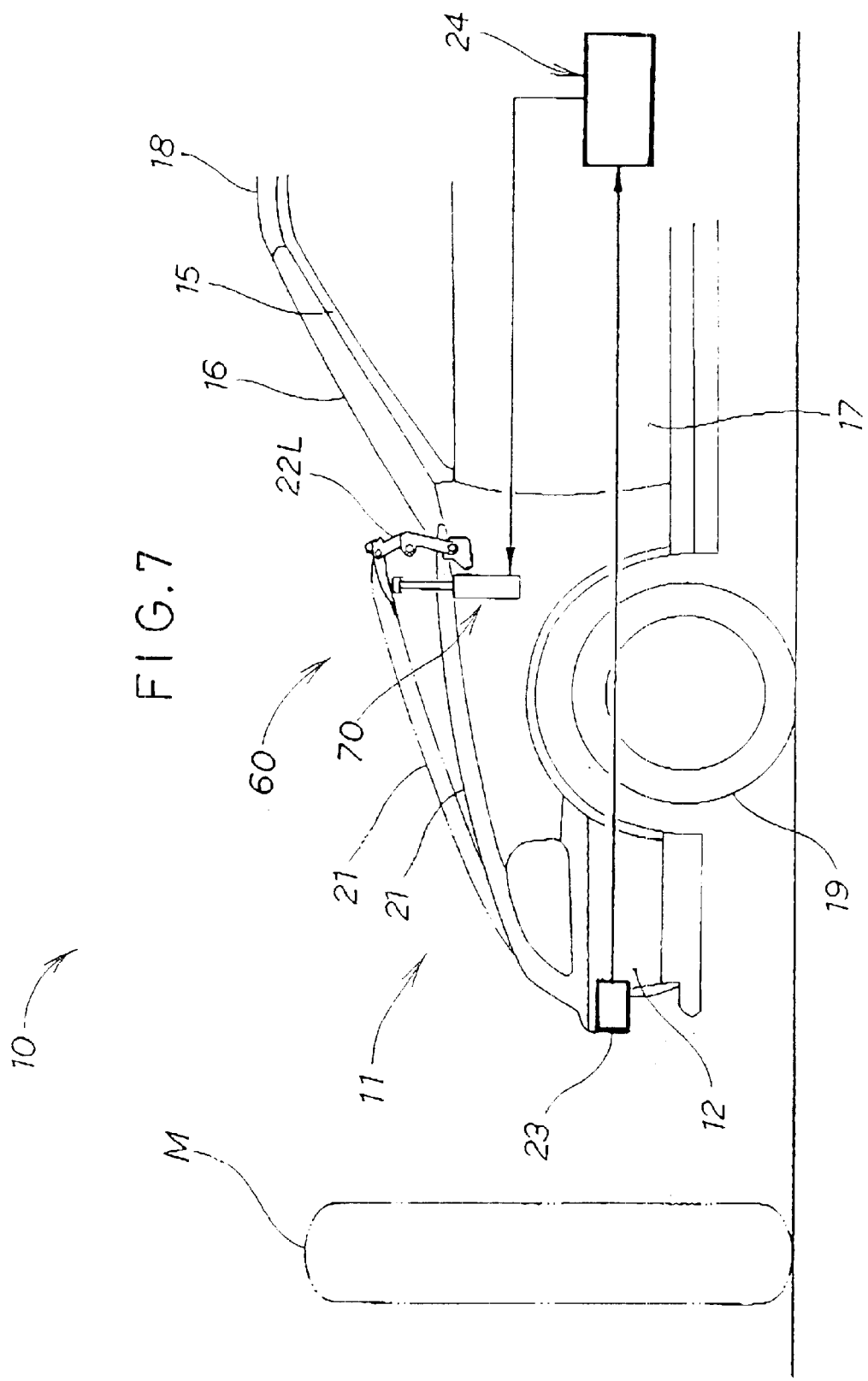

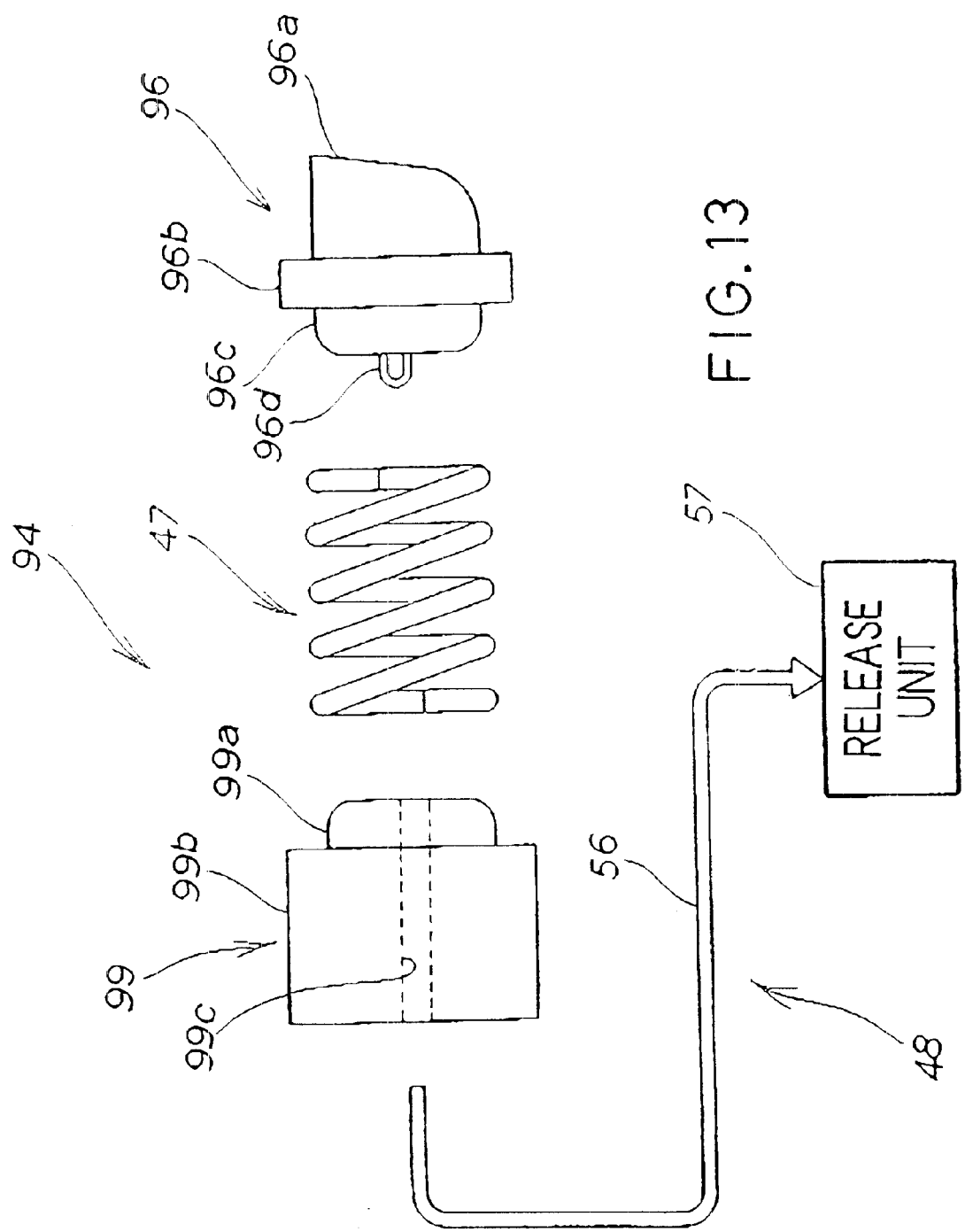

VEHICLE HOOD APPARATUS

BACKGROUND OF THE INVENTION

1. Field of the Invention

This invention relates to an improvement in a vehicle hood apparatus having an actuator for lifting a vehicle hood to an appropriate extent upon collision of an object with the vehicle.

2. Description of the Related Art

An object colliding with the front part of a running vehicle is often likely to jump up and fall on its hood. It is often necessary to protect such an object from any impact produced by such a collision. Therefore, there are known vehicle hood apparatuses for lifting the hood of a vehicle to some extent upon collision of an object with the vehicle and thereby reducing any impact acting upon the object, as disclosed in, for example, Japanese Patent Laid-Open Publication No. HEI-9-315266.

The apparatus disclosed therein includes a control system which is informed of the collision of an object as detected by a pedestrian collision sensor attached to a front bumper, and a hood lifting and holding mechanism which lifts the hood and holds it in its lifted position in accordance with information from the control system. The hood lifting and holding mechanism (hereinafter called the actuator) has on its rod a hook which is fastened to the vehicle body for holding the hood. The hook is fastened to the rod rotatably by a supporting pin and urged by a compression spring.

The hook is, however, not always equal in its locked position, but its locking is low in reliability, as it is locked too tightly in some cases, while too lightly in other cases, depending on the quality of the work done for attaching the actuator to the vehicle body, since the actuator is formed with the hook provided on the rod so that the hood is heed by locking the hook to side of car body.

The actuator is not easy to assemble, as it is a difficult job to assemble its small parts, such as hook, supporting pin and compression spring, with the rod.

Moreover, the hood lifted by the actuator is likely to obstruct the sight of the vehicle's driver since the conventional vehicle hood is to be lifted by on actuator and held in the lifting position, and in any such event, it is desirable that the sight of the driver be recovered quickly.

SUMMARY OF THE INVENTION

It is, therefore, an object of this invention to provide a vehicle hood apparatus having an actuator which is easier to assemble, while it is mounted in its properly locked position.

It is another object of this invention to provide a vehicle hood apparatus which ensures the quick recovery of the sight of the vehicle's driver from its obstruction by the hood lifted upon collision of any body with the vehicle.

According to a first aspect of this invention, there is provided a vehicle hood apparatus having an actuator for lifting a vehicle hood to an appropriate extent upon collision of an object with the vehicle, the actuator comprising an actuator block, a cylinder defined by the block, a piston pin extending into the cylinder through one end thereof, a gas generator situated at the other end of the cylinder for raising the piston pin rapidly, a piston retainer situated at one end of the cylinder for retaining the raised piston pin in the cylinder, a locking member capable of projecting into the cylinder for locking the piston pin held in its raised position by the locking member, and an elastic member associated with the locking member for urging it resiliently to project into the cylinder, so that the hood may be lifted by the raised piston pin and held in its lifted position by the locking member.

The locking member is capable of projecting into the cylinder. Upon collision of an object with the vehicle, the gas generator is actuated to raise the piston pin rapidly, and the vehicle hood is lifted by the actuator to a certain extent. The locking member immediately projects into the cylinder to lock the piston pin in its raised position and thereby hold the hood in its lifted position.

As the actuator includes the locking member which is capable of projecting into the cylinder for locking the piston pin in its raised position, the locked position of the piston pin does not depend on the quality of the work done for attaching the actuator to the vehicle body, as opposed to, say, the case where the piston pin has to be locked to the vehicle body. As the locking and elastic members are held in the actuator block, the actuator is easier to assemble than, say, when they have to be held on the piston pin.

According to a second aspect of this invention, there is provided a vehicle hood apparatus having an actuator for lifting a vehicle hood to an appropriate extent upon collision of an object with the vehicle, the actuator comprising an actuator block, a cylinder defined by the block, a piston pin extending into the cylinder through one end thereof, a gas generator situated at the other end of the cylinder for raising the piston pin rapidly, a piston retainer situated at one end of the cylinder for retaining the raised piston pin in the cylinder, a locking member capable of projecting into the cylinder for locking the piston pin held by the locking member in its raised position, the locking member having a hole extending between its front and back sides to maintain an equal gas pressure therebetween, and an elastic member associated with the locking member for urging it resiliently to project into the cylinder, so that the hood may be lifted by the raised piston pin and held in its lifted position by the locking member.

The locking member is capable of projecting into the cylinder. Upon collision of an object with the vehicle, the gas generator is actuated to raise the piston pin rapidly, and the vehicle hood is lifted by the actuator to a certain extent. The locking member immediately projects into the cylinder to lock the piston pin in its raised position and thereby hold the hood in its lifted position.

As the actuator includes the locking member which is capable of projecting into the cylinder for locking the piston pin in its raised position, the locked position of the piston pin does not depend on the quality of the work done for attaching the actuator to the vehicle body. As the locking and elastic members are held in the actuator block, the actuator is easier to assemble.

The locking member has a hole which enables an equal gas pressure to be maintained between its front and back ends, so that it may act rapidly without being affected by the pressure of gas generated by the gas generator.

According to a third aspect of this invention, there is provided a vehicle hood apparatus having an actuator for lifting a vehicle hood to an appropriate extent upon collision of an object with the vehicle, the actuator comprising an actuator block, a cylinder defined by the block, a piston pin extending into the cylinder through one end thereof, a gas generator situated at the other end of the cylinder for raising the piston pin rapidly, a piston retainer situated at one end of the cylinder for retaining the raised piston pin in the cylinder, a locking member capable of projecting into the cylinder for locking the piston pin held by the locking member in its raised position, an elastic member associated with the locking member for urging it resiliently to project into the cylinder, an unlocking device for retracting the locking member to predetermined position to release it from its locking action and a control device for actuating the unlocking device in an approriately timed relation to the locking member, so that the hood may be lifted by the raised piston pin and held in its lifted position by the locking member, while after a certain period of time, the locking member is released from its locking action to allow the hood to be lowered.

The apparatus includes an unlocking device for retracting the locking member to predetermined position to release it from its locking action and a control device for actuating the unlocking device in an approriately timed relation to the locking member. Upon collision of an object with the vehicle, the gas generator is actuated to raise the piston pin rapidly, and the vehicle hood is lifted to a certain extent by the actuator. The locking member immediately projects into the cylinder to lock the piston pin in its raised position and thereby hold the hood in its lifted position. After a certain period of time, the unlocking device is actuated in response to information from the control device to release the locking member to allow the hood to be lowered.

The unlocking device ensures that the hood be lowered so as not to obstruct the sight of the driver if it is no longer necessary to hold the hood by operating the actuator in its lifted position as required for, say, protecting any structure within the hood from any impact caused by an object hitting the hood and deforming it.

BRIEF DESCRIPTION OF THE DRAWINGS

Certain preferred embodiments of the present invention will now be described in detail, by way of example only, with reference to the accompanying drawings, in which:

FIG. 5 is an exploded view of a locking mechanism in the apparatus according to the first embodiment of this invention;

FIG. 7 is a side elevation showing the working principle of a vehicle hood apparatus according to a second embodiment of this invention;

FIG. 13 is an exploded view of a locking mechanism and an unlocking device in the apparatus according to the third embodiment of this invention;

DETAILED DESCRIPTION OF THE PREFERRED EMBODIMENTS

The following description is merely exemplary in nature and is in no way intended to limit the invention, its application or uses.

Figure 1:
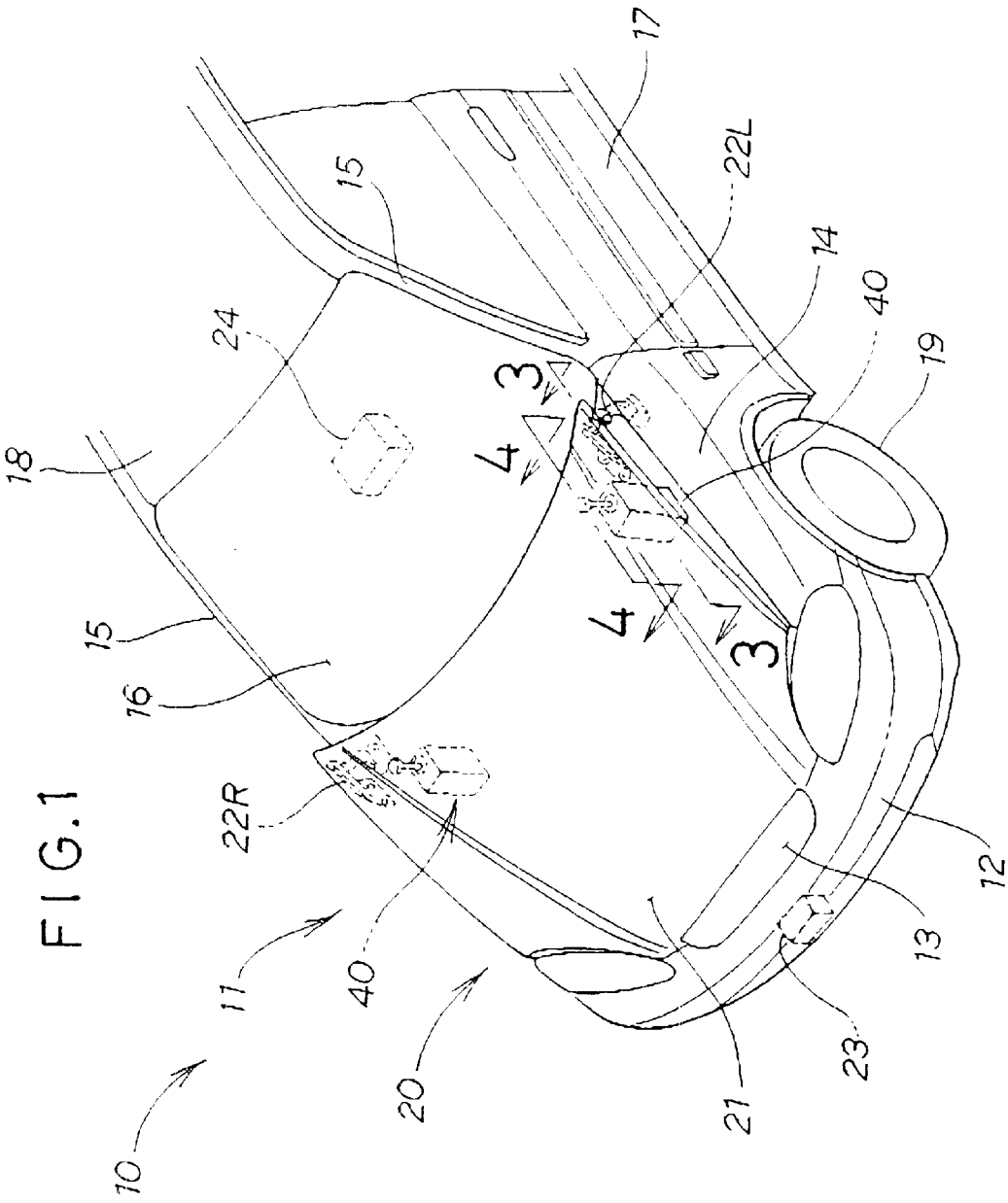
FIG. 1 is a perspective view of a vehicle carrying a vehicle hood apparatus according to a first embodiment of this invention.

Referring first to FIG. 1, there is shown a vehicle 10 carrying a vehicle hood apparatus 20 according to a first embodiment of this invention. The vehicle 10 is shown with a vehicle body 11, a front bumper 12, a radiator grill 13, a front fender 14, a pair of front pillars 15, a windshield 16, a door 17, a root 18, a front wheel 19 a vehicle hood apparatus 20 and an actuator 40 of the vehicle hood apparatus 20.

The actuators 40 are easy to assemble and each actuator 40 has a properly locked position not depending on the quality of work done for its attachment, as will be obvious from the following.

Figure 2:
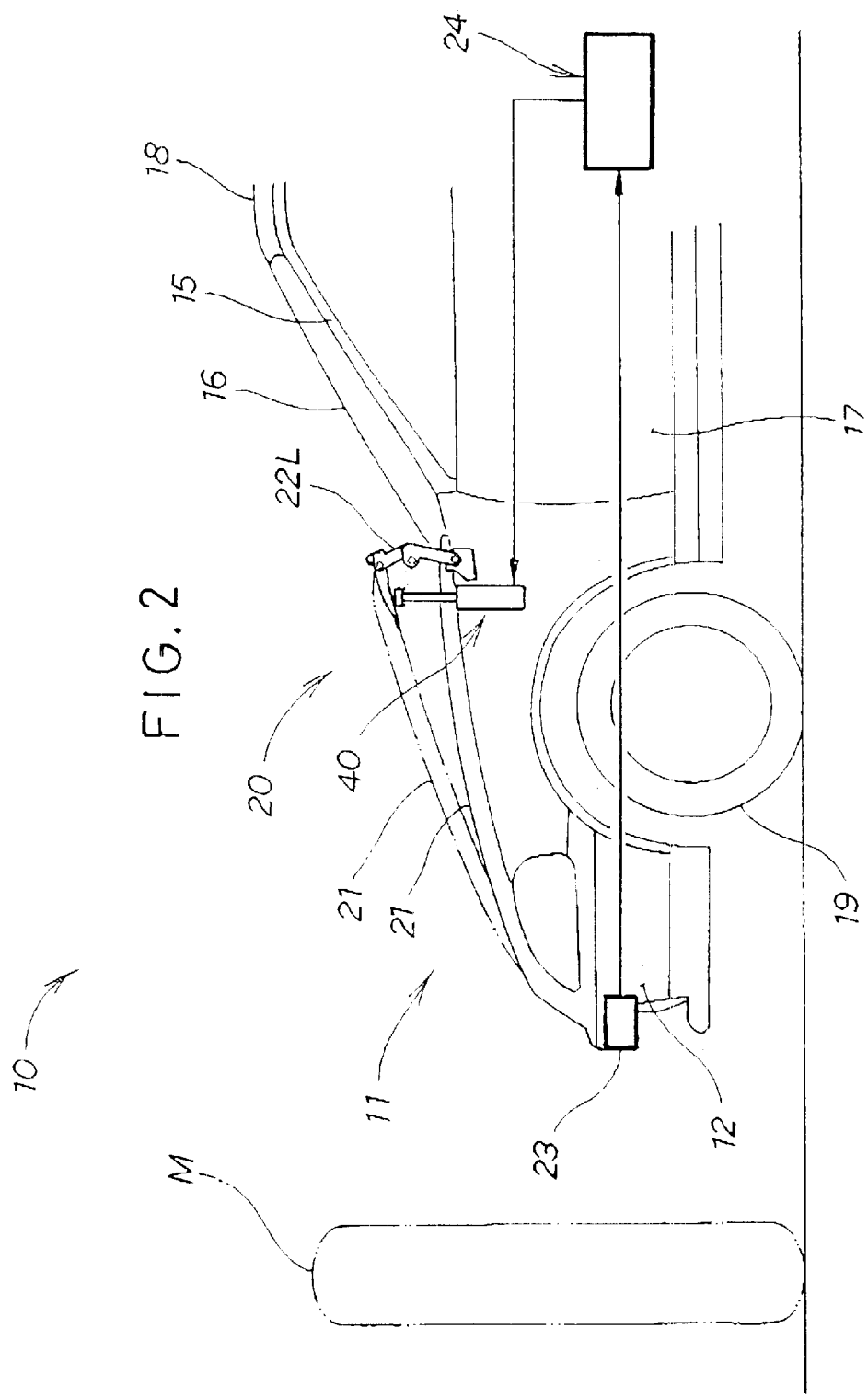
FIG. 2 is a side elevation showing the working principle of the apparatus according to the first embodiment of this invention.

The vehicle hood apparatus 20 comprises a vehicle hood 21 covering the front part of the vehicle body 11, a pair of right and left hinges 22R and 22L (only 22L is shown) allowing the hood 21 to be opened and closed, a pair of actuators 40 for lifting the hood 21, a sensor 23 for detecting the collision of an object M with the front bumper 12 and a control device 24 for controlling the operation of the actuators 40 in accordance with information from the sensor 23, as shown in FIG. 2. An acceleration sensor is a preferred example of sensor 23.

Figure 3:
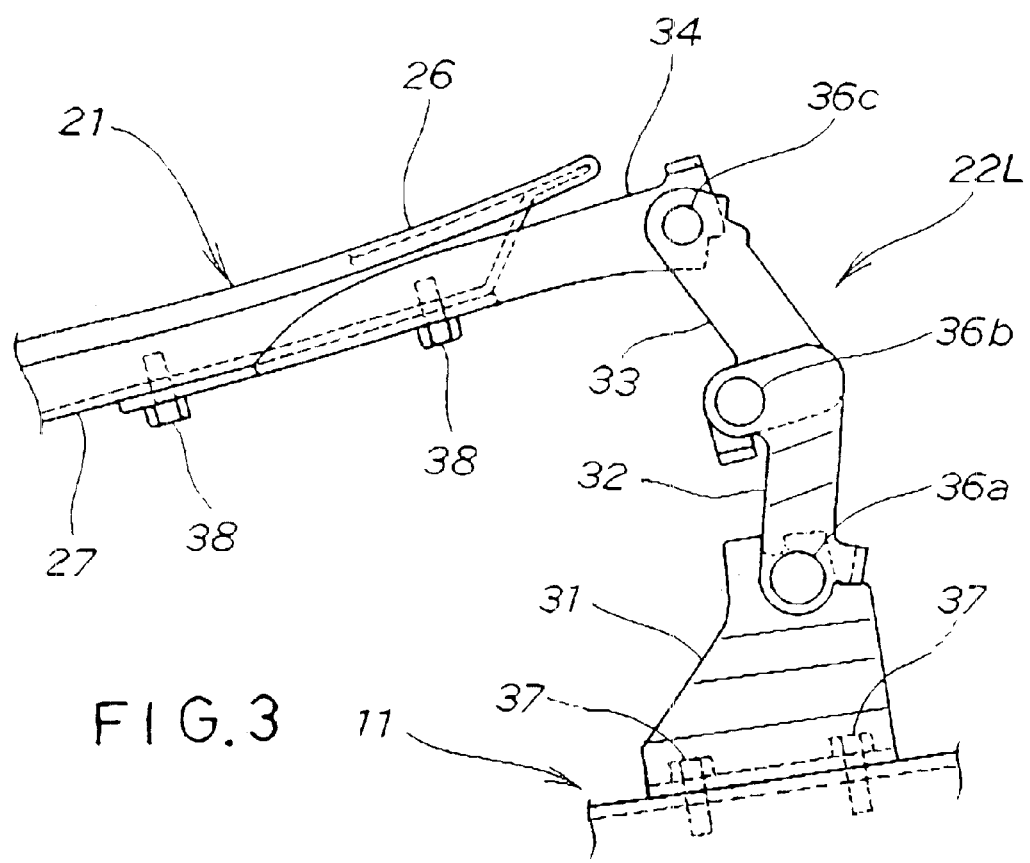
FIG. 3 is a sectional view taken along line 3—3 in FIG. 1.

FIG. 3 is a sectional view taken along the line 3—3 in FIG. 1 and shows a part of the hood 21 and the left hinge 22L in side elevation.

The hood 21 is composed of an outer panel 26 and an inner panel 27 lying under the outer panel 26 for reinforcing it.

The hinge 22L is composed of a hinge base 31 fastened to the vehicle body 11 by bolts 37, a first link 32 having one end connected to the hinge base 31 rotatably by a pin 36a, a second link 33 having one end connected to the other end of the first link 32 rotatably by a pin 36b and a hood supporting stay 34 connected to the other end of the second link 33 rotatably by a pin 36c. The hinge base 31 is bolted at 37 to the vehicle body 11. The hood 21 is bolted at 38 to the stay 34.

The right hinge 22R (FIG. 1) is symmetric to the left hinge 22L with respect to the centerline of the vehicle 10 and no detailed description thereof is, therefore, made.

Figure 4:
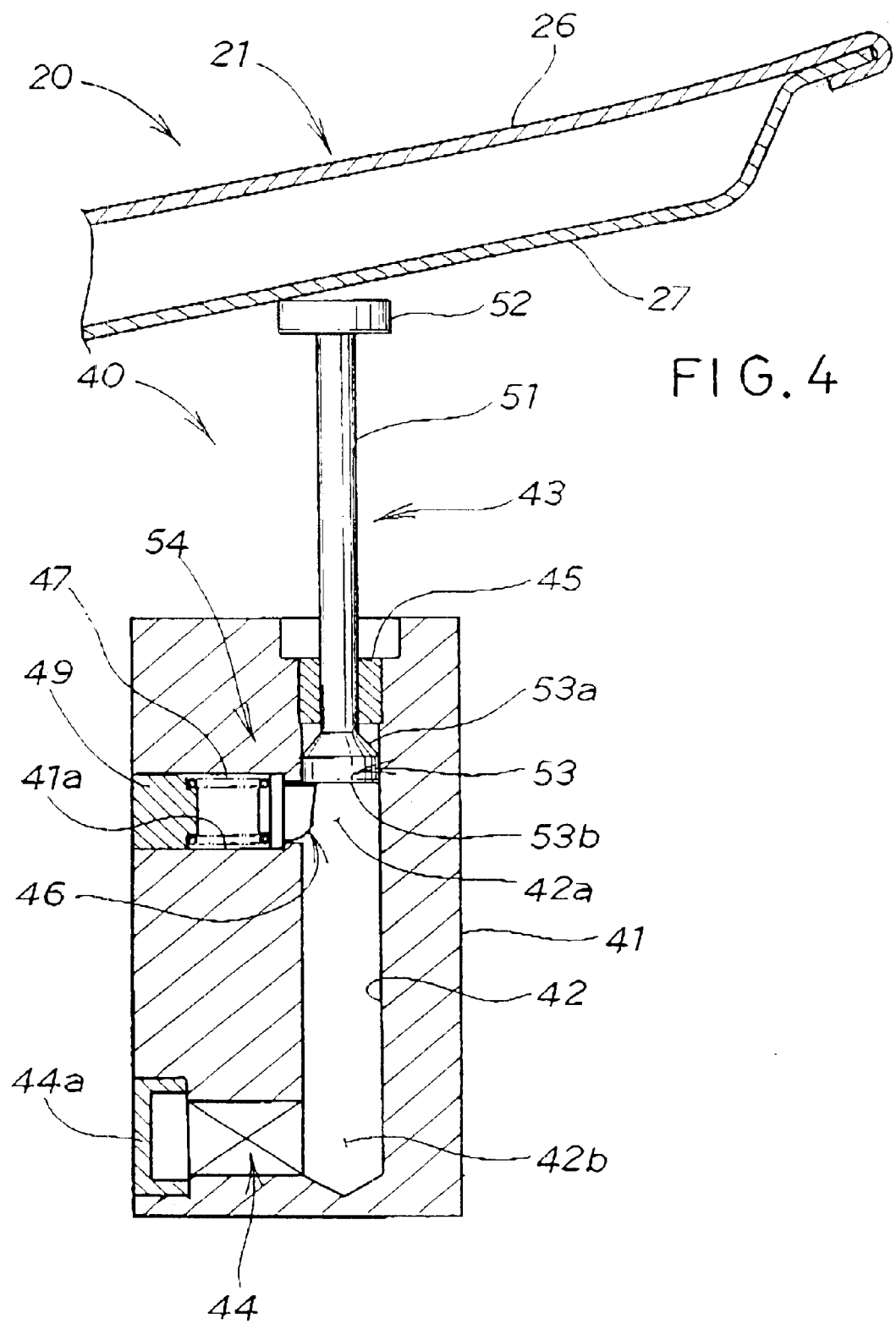
FIG. 4 is a sectional view taken along line 4—4 in FIG. 1.

FIG. 4 is a sectional view taken along the line 4—4 in FIG. 1 and shows one of the actuators 40 in elevation. Each actuator 40 is composed of an actuator block 41 attached to the vehicle body 11 (FIG. 2), a cylinder 42 defined by the actuator block 41, a piston pin 43 extending into the cylinder 42 through one end 42a thereof, a gas generator 44 situated at the other end 42b of the cylinder 42 for raising the piston pin 43 rapidly, a piston retainer 45 situated at one end 42a of the cylinder 42 for retaining the raised piston pin 43 in the cylinder 42, a locking member 46 capable of projecting into the cylinder 42 for locking the piston pin 43 held by the locking member in its raised position, and a compression spring 47 defining an elastic member associated with the locking member 46 for urging it resiliently to project into the cylinder 42.

The compression spring 47 is connected between the locking member 46 and a bush 49. The actuator block 41 has a cylindrical hole 41a connected with the cylinder 42 and holding together the locking member 46, compression spring 47 and bush 49 which define a locking mechanism 54 as will be described in detail.

The actuator block 41 is formed to be attached to the vehicle body 11 (see FIG. 1) from an aluminum or iron alloy and the cylinder 42 is a substantially cylindrical space defined by the actuator block 41.

The piston pin 43 is composed of a rod portion 51, a pad 52 attached to one end of the rod portion 51 for abutting on the hood 21 and a piston 53 attached to the other end of the rod portion 51 for sliding on the wall of the cylinder 42. The piston 53 has a tapered portion 53a. The gas generator 44 has a cover 44a fitted in the actuator block 41 and contains gunpowder not shown, but used for generating gas.

The piston retainer 45 closes the cylinder 42 tightly, while guiding the piston pin 43 for its vertical movement.

The locking mechanism 54 of the hood 20 according to the first embodiment will now be described in detail with reference to FIG. 5 which is an exploded view. The locking member 46 has a locking portion 46a adapted to hold the piston 53 of the piston pin 43 as shown in FIG. 4, a sliding portion 46b fitted slidably in the cylindrical hole 41a of the block 41 and a spring holding portion 46c for the compression spring 47.

The compression spring 47 supports the locking member 46 and urges it to project into the cylinder 42.

The bush 49 has a fitting portion 49a fitted tightly in the cylindrical hole 41a of the block 41 and a spring holding portion 49b for the compression spring 47.

Referring to FIG. 4 again, the vehicle hood apparatus 20 can be summarized as the vehicle hood apparatus having the actuators 40 for lifting the vehicle hood 21 to an appropriate extent upon collision of an object M (FIG. 2) with the vehicle 10, wherein each actuator comprises the actuator block 41 attached to the vehicle body 11 (FIG. 2), the cylinder 42 defined by the block 41, the piston pin 43 extending into the cylinder 42 through one end 42a thereof, the gas generator 44 situated at the other end 42b of the cylinder 42 for raising the piston pin 43 rapidly, the piston retainer 45 situated at one end 42a of the cylinder 42 for retaining the raised piston pin 43 in the cylinder 42, the locking member 46 capable of projecting into the cylinder 42 for locking the piston pin 43 in its raised position, and the compression spring 47 associated with the locking member 46 for urging it resiliently to project into the cylinder 42, so that the hood 21 may be lifted by the raised piston pin 43 and held in its lifted position by the locking member 46.

The apparatus 20 includes the locking member 46 which is capable of projecting into the cylinder 42. upon collision of an object M with the vehicle 10 (FIG. 2), the gas generator 44 is actuated to raise the piston pin 43 rapidly, and the vehicle hood 21 is lifted by the actuator 40 to a certain extent. The locking member 46 immediately projects into the cylinder 42 to lock the piston pin 43 in its raised position and thereby hold the hood 21 in its lifted position.

As the actuator 40 includes the locking member 46 which is capable of projecting into the cylinder 42 for locking the piston pin 43 in its raised position, the locked position of the piston pin 43 does not depend on the quality of the work done for attaching the actuator 40 to the vehicle body, as opposed to, say, the case where the piston pin 43 has to be locked to the vehicle body 10 (FIG. 2). As the locking member 46 and the compression spring 47 are held in the actuator block 41, the actuator 40 is easier to assemble than, say, when they have to be held on the piston pin 43.

The vehicle hood apparatus 20 is highly reliable, insofar as the locked position of the piston pin 43 does not depend on the quality of the work done for attaching each actuator 40 to the vehicle body. The actuators 40 which are easy to assemble can be prepared at a low cost, thereby making it possible to manufacture the whole apparatus 20 at a low cost.

Figure 6C:
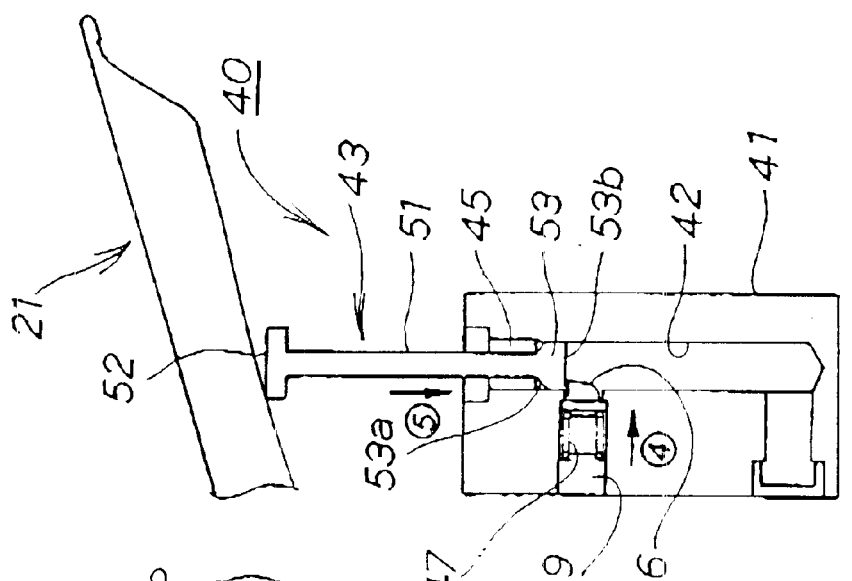
FIGS. 6A to 6C are a series of diagrams explaining the operation of the apparatus according to the first embodiment of this invention.
Figure 6B:
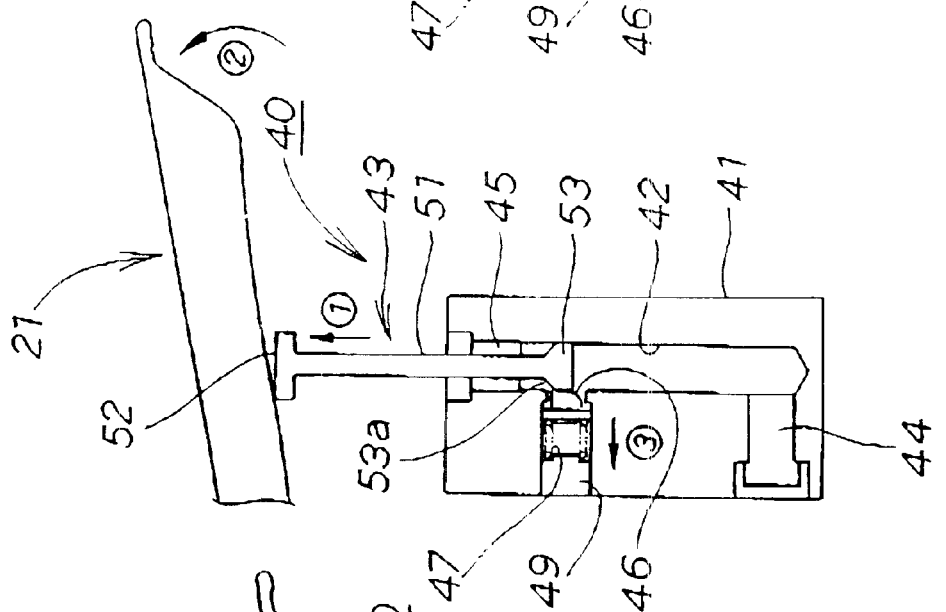
Figure 6A:
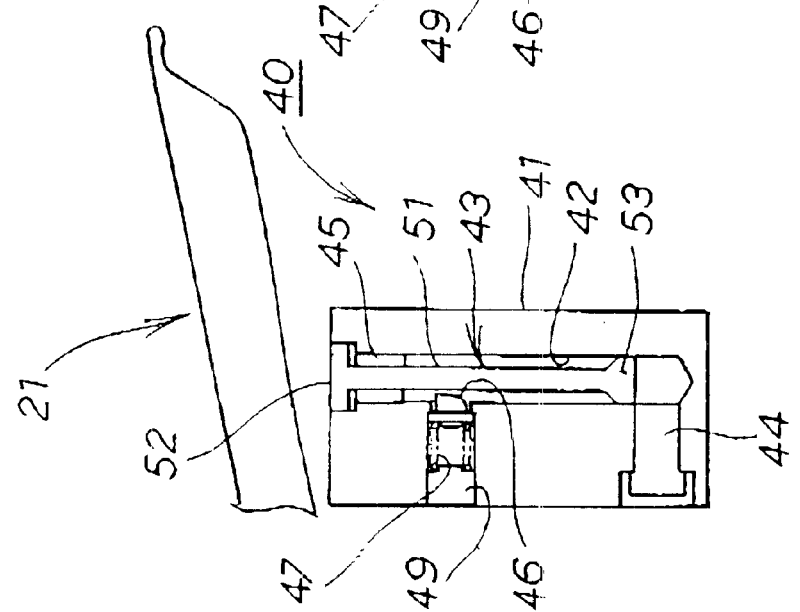

Description will now be made of the operation of the vehicle hood apparatus 20 with reference to FIGS. 6A to 6C showing the working sequence of each actuator 40.

FIG. 6A shows the actuator 40 in its standby position in which the piston rod 43 stays within the cylinder 42, and the locking member 46 stays in its projected position.

If the gas generator 44 is actuated, the rod 43 is raised as shown by an arrow (1) in FIG. 6B to lift the vehicle hood 21 as shown by an arrow (2), while the tapered portion 53a of the piston 53 causes the locking member 46 to retract as shown by an arrow (3), so that the locking member 46 may not obstruct the upward movement of the piston pin 43.

Its upward movement is stopped by the abutment of the piston 53 of the piston pin 43 on the piston retainer 45, as shown in FIG. 6C. When the piston pin 43 is in its raised position, the piston 53 has its bottom 53b staying above the locking member 46 urged by the compression spring 47 to return to its projected position as shown by an arrow (4). The locking portion 46a of the locking member 46 stays under the bottom 53b of the piston 53 to lock the piston pin 43 in its raised position and thereby hold the hood 21 in its lifted position without allowing it to move down as shown by an arrow (5).

Although the vehicle hood apparatus 20 according to the first embodiment has two actuators 40 as shown in FIG. 3, it may be so modified as to have only a single actuator, or three or more actuators.

FIG. 7 shows the working principle of a vehicle hood apparatus 60 according to a second embodiment of this invention. Some of the reference numerals used for the description of the apparatus 20 according to the first embodiment of this invention are used to denote like parts of the apparatus 60, and no detailed description of any such part is, therefore, repeated.

The apparatus 60 comprises a vehicle hood 21 covering the front part of the vehicle body 11, a pair of right and left hinges 22R and 22L allowing the hood 21 to be opened and closed (only 22L is shown), a pair of actuators 70 for lifting the hood 21, a sensor 23 for detecting the collision of an object M with the front bumper 12 and a control device 24 for controlling the operation of the actuators 70 in accordance with information from the sensor 23.

Figure 8:
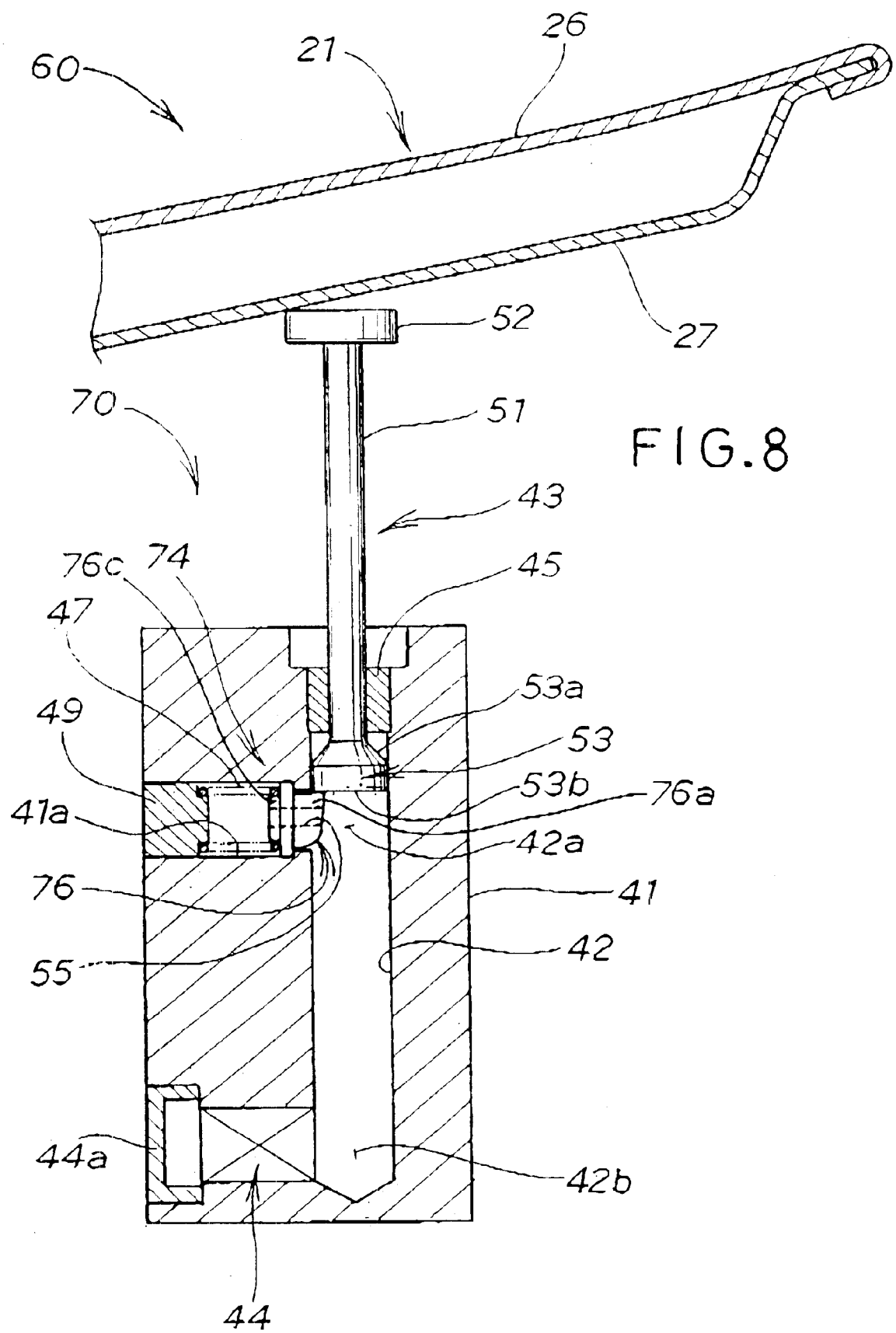
FIG. 8 is a front elevational view, partly in section, of the apparatus according to the second embodiment of this invention.

Referring to FIG. 8 showing the apparatus 60 according to the second embodiment of this invention and more particularly one of the actuators 70 in elevation, each actuator 70 is composed of an actuator block 41 attached to the vehicle body 11 (FIG. 7), a cylinder 42 defined by the actuator block 41, a piston pin 43 extending into the cylinder 42 through one end 49a thereof, a gas generator 44 situated at the other end 42b of the cylinder 42 for raising the piston pin 43 rapidly, a piston retainer 45 situated at one end 42a of the cylinder 42 for retaining the raised piston pin 43 in the cylinder 42, a locking member 76 capable of projecting into the cylinder 42 for locking the piston pin 43 held by the locking member in its raised position, and a compression spring 47 defining an elastic member associated with the locking member 76 for urging it resiliently to project into the cylinder 42.

Figure 9:
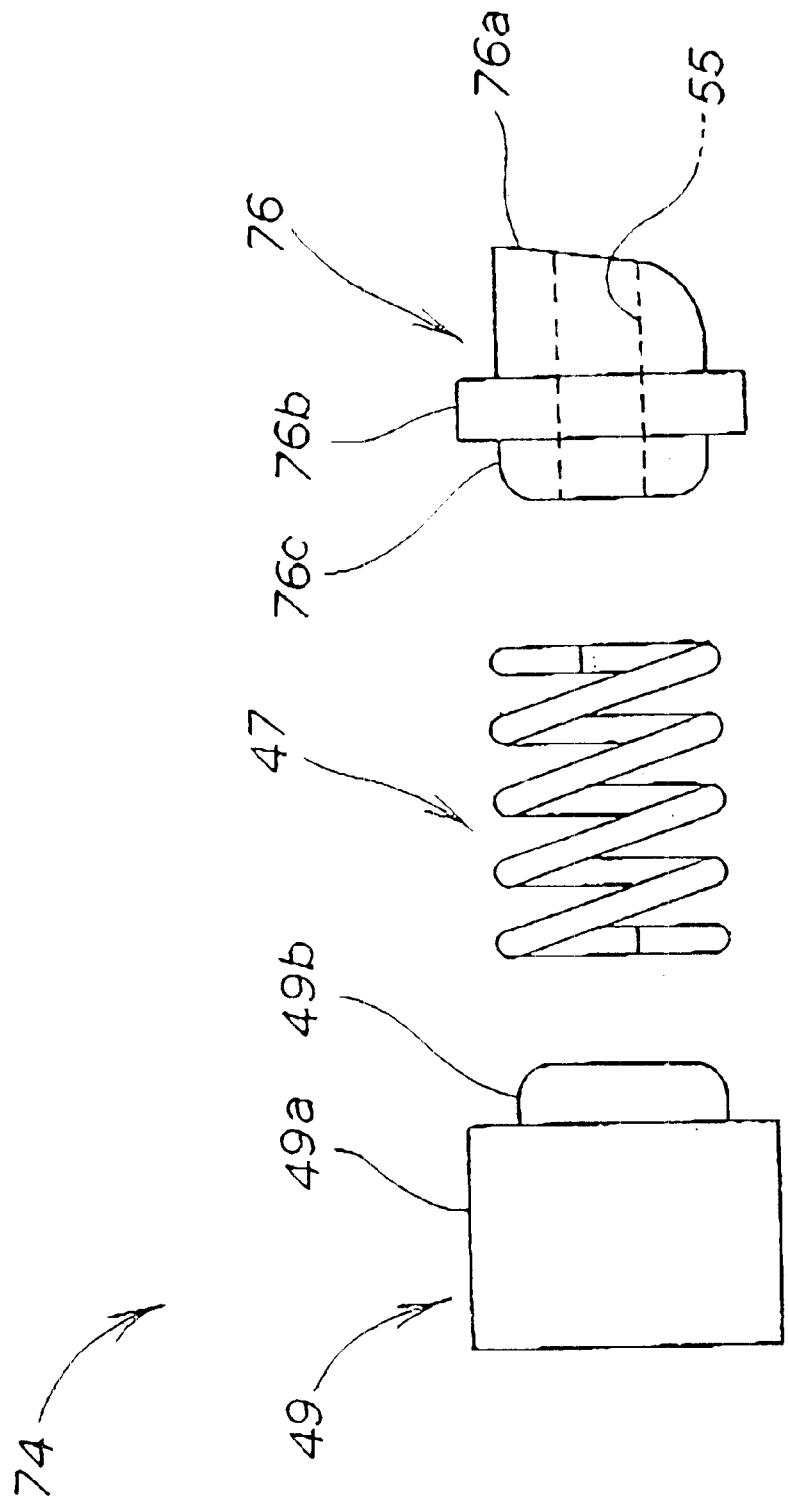
FIG. 9 is an exploded view of a locking mechanism in the apparatus according to the second embodiment of this invention.

The compression spring 47 is connected between the locking member 76 and a bush 49. The actuator block 41 has a cylindrical hole 41a connected with the cylinder 42 and holding together the locking member 76, compression spring 47 and bush 49 which define a locking mechanism 74 as will be described in detail Referring to FIG. 9, the locking member 76 has a locking portion 76a formed on its front end and adapted to hold the piston 53 of the piston pin 43 as shown in FIG. 8, a sliding portion 76b fitted slidably in the cylindrical hole 41a of the block 41 and a spring holding portion 76c formed on its back end for holding the compression spring 47, and according to a salient feature of the locking member 76, it has a hole 55 extending therethrough between its front and back ends to allow gas to flow therethrough, so that an equal gas pressure may act upon both of its locking and spring holding portions 76a and 76c.

Referring to FIG. 8 again, the vehicle hood apparatus 60 can be summarized as the vehicle hood apparatus having the actuators 70 for lifting the vehicle hood 21 to an appropriate extent upon collision of an object M with the vehicle 10 (FIG. 7), wherein each actuator comprises the actuator block 41 attached to the vehicle body 11 (FIG. 7), the cylinder 42 defined by the block 41, the piston pin 43 extending into the cylinder 42 through one end 42a thereof, the gas generator 44 situated at the other end 42b of the cylinder 42 for raising the piston pin 43 rapidly, the piston retainer 45 situated at one end 42a of the cylinder 42 for retaining the raised piston pin 43 in the cylinder 42, the locking member 76 capable of projecting into the cylinder 42 for locking the piston pin 43 in its raised position, the locking member 76 having the hole allowing gas to flow therethrough to exert an equal pressure on both of its locking and spring holding portions 76a and 76c, and the compression spring 47 associated with the locking member 76 for urging it resiliently to project into the cylinder 42, so that the hood 21 may be lifted by the raised piston pin 43 and held in its lifted position by the locking member 76.

The apparatus 60 includes the locking member 76 urged to project into the cylinder 42. Upon collision of an object M with the vehicle 10 (FIG. 7), the gas generator 44 is actuated to raise the piston pin 43 rapidly, and the vehicle hood 21 is lifted to a certain extent. The locking member 76 immediately projects into the cylinder 42 to lock the piston pin 43 in its raised position and thereby hold the hood 21 in its lifted position.

As the actuator 70 includes the locking member 76 which is capable of projecting into the cylinder 42 for locking the piston pin 43 in its raised position, the locked position of the piston pin 43 does not depend on the quality of the work done for attaching the actuator 70 to the vehicle body, as opposed to, say, the case where the piston pin 43 has to be locked to the vehicle body 10 (FIG. 7). As the locking member 76 and the compression spring 47 are held in the actuator block 41, the actuator 70 is easier to assemble than, say, when they have to be held on the piston pin 43.

The hole 55 extending between the locking and spring holding portions 76a and 76c of the locking member 76 allows gas to flow therethrough and exert an equal gas pressure therebetween, so that the locking member 76 may act rapidly without being affected by the pressure of gas generated by the gas generator 44.

The vehicle hood apparatus 60 is highly reliable, insofar as the locked position of the piston pin 43 does not depend on the quality of the work done for attaching each actuator 70 to the vehicle body. The actuators 70 which are easy to assemble can be prepared at a low cost, thereby making it possible to manufacture the whole apparatus 60 at a low cost. The hole 55 formed in the locking member 76 of the actuator 60 to allow gas to flow therethrough ensures the still higher reliability of the apparatus.

Figure 10:
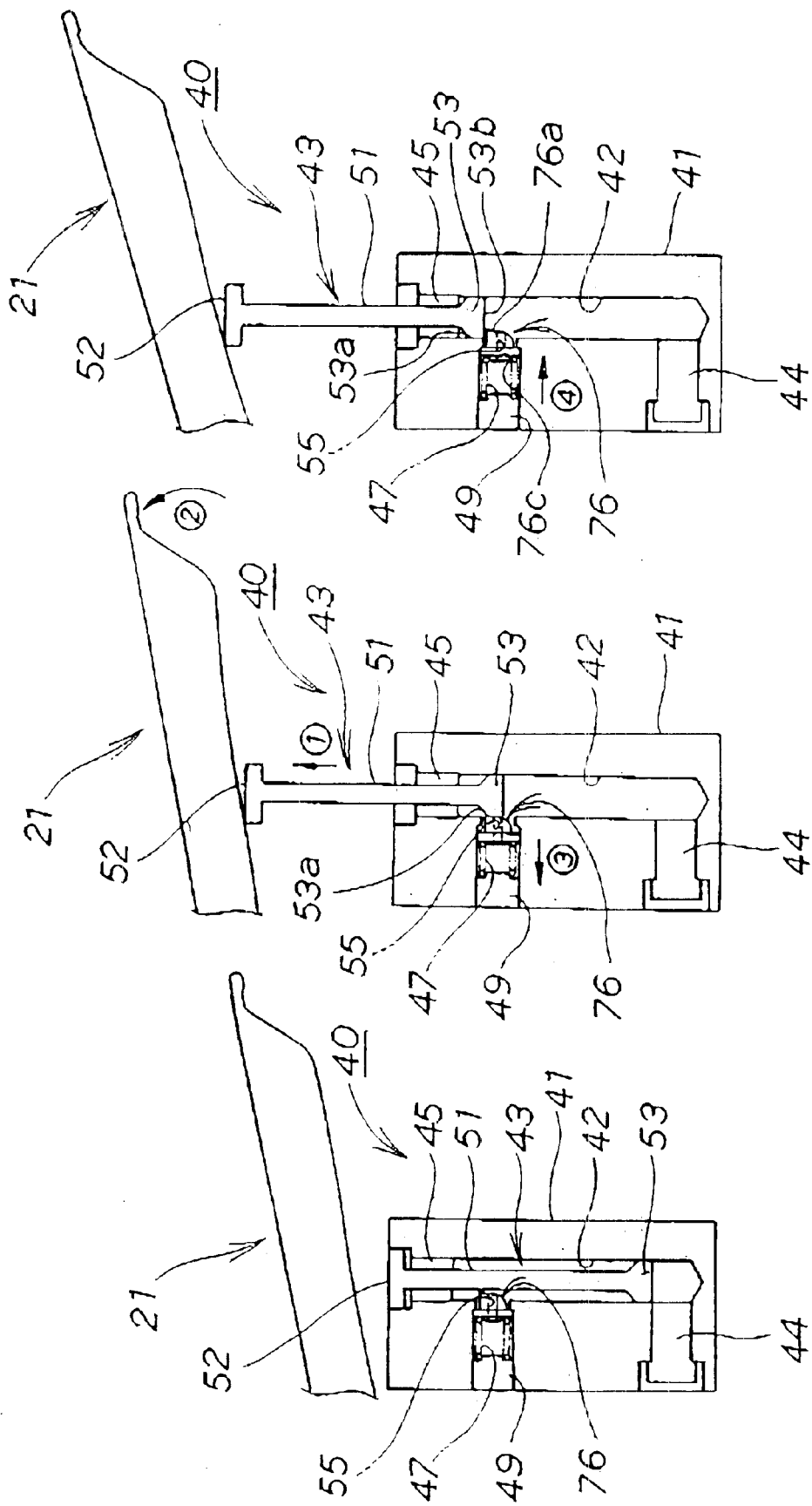
FIGS. 10A to 10C are a series of diagrams explaining the operation of the apparatus according to the second embodiment of this invention.

Description will now be made of the operation of the vehicle hood apparatus 60 with reference to FIGS. 10A to 10C showing the working sequence of each actuator 70.

FIG. 10A shows the actuator 70 in its standby position in which the piston rod 43 stays within the cylinder 42, and the locking member 76 stays in its projected position.

If the gas generator 44 is actuated, the rod 43 is raised as shown by an arrow (1) in FIG. 10B to lift the vehicle hood 21 as shown by an arrow (2), while the tapered portion 53a of the piston 53 causes the locking member 76 to retract as shown by an arrow (3), so that the locking member 76 may not obstruct the upward movement of the piston pin 43.

Its upward movement is stopped by the abutment of the piston 53 on the piston retainer 45, as shown in FIG. 10C. When the piston pin 43 is in its raised position, the piston 53 has its bottom 53b staying above the locking member 76 urged by the compression spring 47 to return to its projected position as shown by an arrow (4). The locking portion 76a of the locking member 76 stays under the bottom 53b of the piston 53 to lock the piston pin 43 in its raised position and thereby hold the hood 21 in its lifted position.

The hole 55 extending between the locking and spring holding portions 76a and 76c of the locking member 76 allows gas to flow therethrough and exert an equal gas pressure therebetween, so that the locking member 76 may act rapidly without being affected by the pressure of gas generated by the gas generator 44. This ensures the still higher reliability of the apparatus 60.

Figure 11:
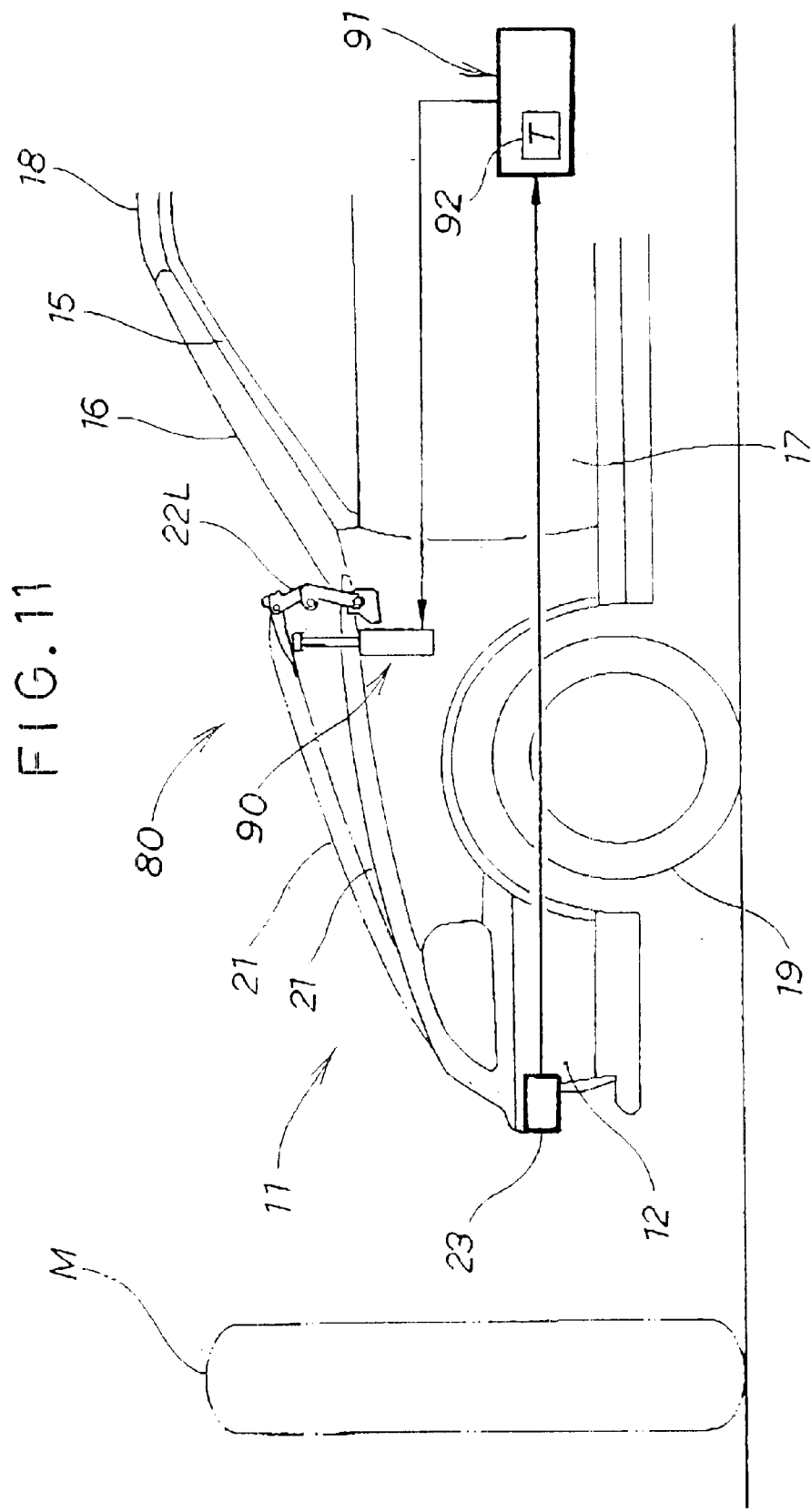
FIG. 11 is a side elevation showing the working principle of a vehicle hood apparatus according to a third embodiment of this invention.

FIG. 11 shows the working principle of a vehicle hood apparatus 80 according to a third embodiment of this invention. Some of the reference numerals used for the description of the apparatus 20 according to the first embodiment of this invention are used to denote like parts of the apparatus 80, and no detailed description of any such part is, therefore, repeated.

The apparatus 80 comprises a vehicle hood 21 covering the front part of the vehicle body 11, a pair of right and left hinges 22R and 22L allowing the hood 21 to be opened and closed (only 22L is shown), a pair of actuators 90 for lifting the hood 21, a sensor 23 for detecting the collision of an object M with the front bumper 12 and a control device 91 for controlling the operation of the actuators 90 in accordance with information from the sensor 23. The control device 91 includes a timer 92 for controlling the timed operation of the actuators 90.

Figure 12:
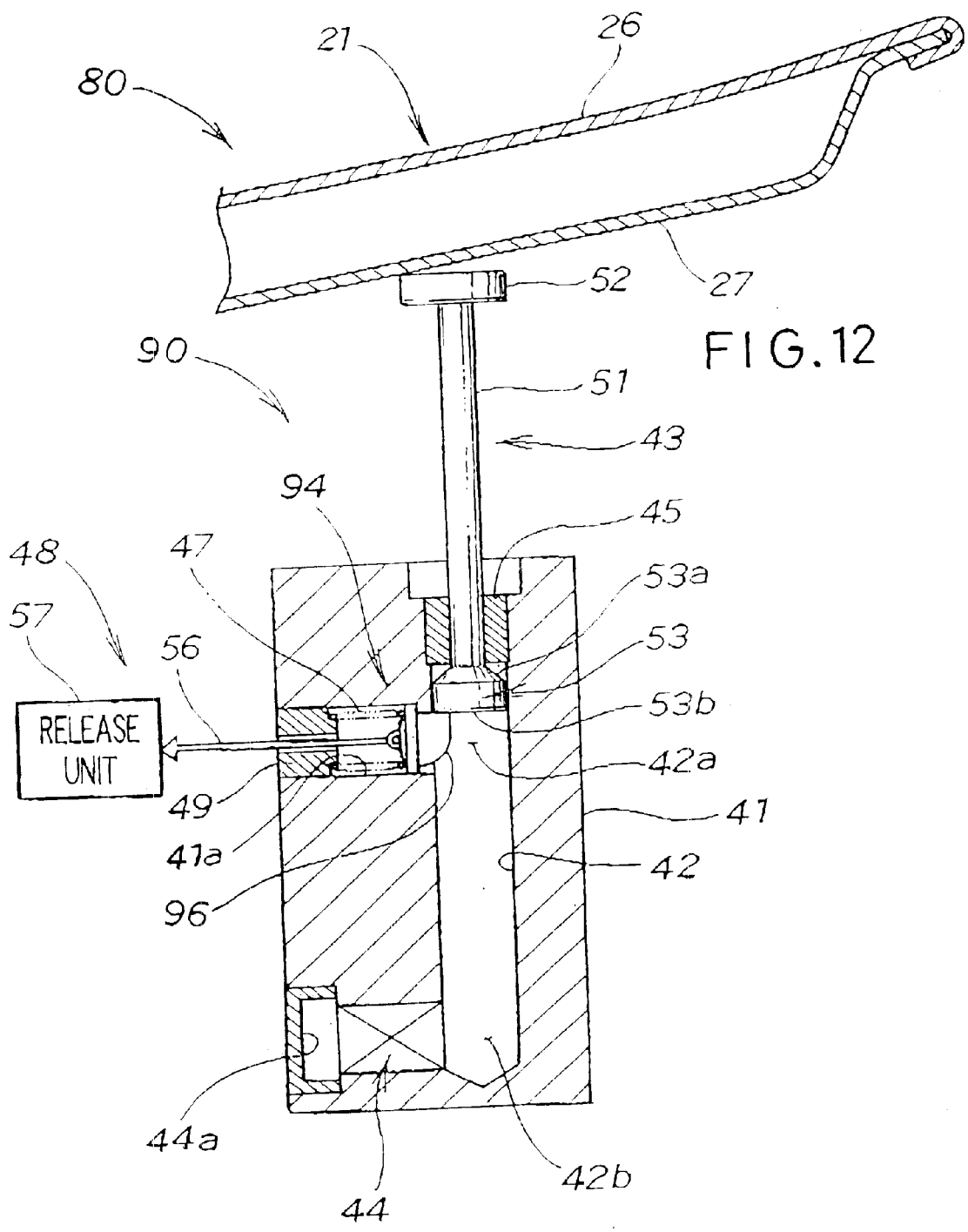
FIG. 12 is a front elevational view, partly in section, of the apparatus according to the third embodiment of this invention.

Referring to FIG. 12 showing the apparatus 80 and more particularly one of the actuators 90 in elevation, each actuator 90 is composed of an actuator block 41 attached to the vehicle body 11 (FIG. 11), a cylinder 42 defined by the actuator block 41, a piston pin 43 extending into the cylinder 42 through one end 42a thereof, a gas generator 44 situated at the other end 42b of the cylinder 42 for raising the piston pin 43 rapidly, a piston retainer 45 situated at one end 42a of the cylinder 42 for retaining the raised piston pin 43 in the cylinder 42, a locking member 96 capable of projecting into the cylinder 42 for locking the piston pin 43 held by the locking member in its raised position, a compression spring 47 defining an elastic member associated with the locking member 96 for urging it resiliently to project into the cylinder 42 and an unlocking device 48 connected to the locking member 96 for retracting it to a certain position from its locking position.

The compression spring 47 is connected between the locking member 96 and a bush 99. The actuator block 41 has a cylindrical hole 41a connected with the cylinder 42 and holding together the locking member 96, compression spring 47 and bush 99 which define a locking mechanism 94 as will be described in detail.

Referring to FIG. 13 which is an exploded view of a locking mechanism 94 and unlocking device 48 in the apparatus 80 according to the third embodiment of this invention, the unlocking device 48 is composed of a connecting wire 56 having one end fastened to the locking member 96 and a release unit 57 connected to the other end of the wire 56.

The release unit 57 pulls the connecting wire 56 in response to a signal from the control device 91 (FIG. 11) and preferably comprises a plunger, or cylinder. Referring to the locking mechanism 94, the locking member 96 has a locking portion 96a adapted to hold the piston 53 of the piston pin 43 as shown in FIG. 12, a sliding portion 96b fitted slidably in the cylindrical hole 41a of the block 41, a spring holding portion 96c for the compression spring 47 and a wire fastening portion 96d to which the connecting wire 56 is fastened.

The bush 99 has a fitting portion 99a fitted tightly in the cylindrical hole 41a of the block 41, a spring holding portion 99b for the compression spring 47 and a hole 99c through which the wire 56 extends.

Referring to FIG. 12 again, the vehicle hood apparatus 80 can be summarized as the vehicle hood apparatus having the actuators 90 for lifting the vehicle hood 21 to an appropriate extent upon collision of an object M with the vehicle 10 (FIG. 11), wherein each actuator comprises the actuator block 41 attached to the vehicle body 11 (FIG. 11), the cylinder 42 defined by the block 41, the piston pin 43 extending into the cylinder 42 through one end 42a thereof, the gas generator 44 situated at the other end 42b of the cylinder 42 for raising the piston pin 43 rapidly, the piston retainer 45 situated at one end 42a of the cylinder 42 for retaining the raised piston pin 43 in the cylinder 42, the locking member 96 capable of projecting into the cylinder 42 for locking the piston pin 43 held by the locking member in its raised position, the compression spring 47 associated with the locking member 96 for urging it resiliently to project into the cylinder 42, an unlocking device 48 for retracting the locking member 96 to release it to a certain position from its locking action and a control device 91 for actuating the unlocking device 48 in an approriately timed relation to the locking member 96 (FIG. 11), so that the hood 21 may be lifted by the raised piston 43 pin and held in its lifted position by the locking member 96, while after a certain period of time, the locking member 96 is released from its locking action to allow the hood 21 to be lowered.

The apparatus 80 includes the unlocking device 48 for retracting each locking member 96 from the cylinder 42 to release it from its locking action and the control device 91 (FIG. 11) for actuating the unlocking device 48 in an approriately timed relation to the locking member 96. Upon collision of an object M with the vehicle 10 (FIG. 11), the gas generator 44 is actuated to raise the piston pin 43 rapidly, and the vehicle hood 21 is lifted by the actuator to a certain extent. The locking member 96 immediately projects into the cylinder 42 to lock the piston pin 43 in its raised position and thereby hold the hood 21 in its lifted position. After a certain period of time, the unlocking device 48 is actuated in response to information from the control device 91 (FIG. 11) to release the locking member 96 to allow the hood 21 to be lowered.

The unlocking device 48 ensures that the hood 21 be lowered so as not to obstruct the sight of the driver if it is no longer necessary to hold the hood 21 in its lifted position as required for, say, protecting any structure within the hood 21 from any impact caused by an object M hitting the hood 21 and deforming it.

Figure 14A:
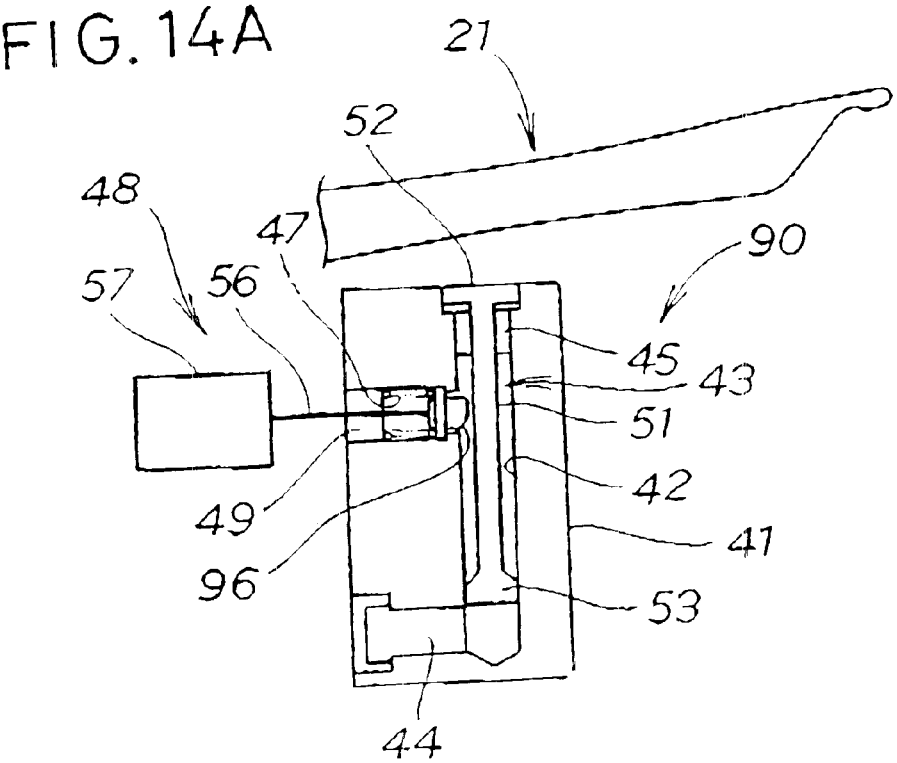
FIGS. 14A and 14B are a set of diagrams explaining the operation of the apparatus according to the third embodiment of this invention and showing an actuator in its standby position and in its started position, respectively.
Figure 14B:
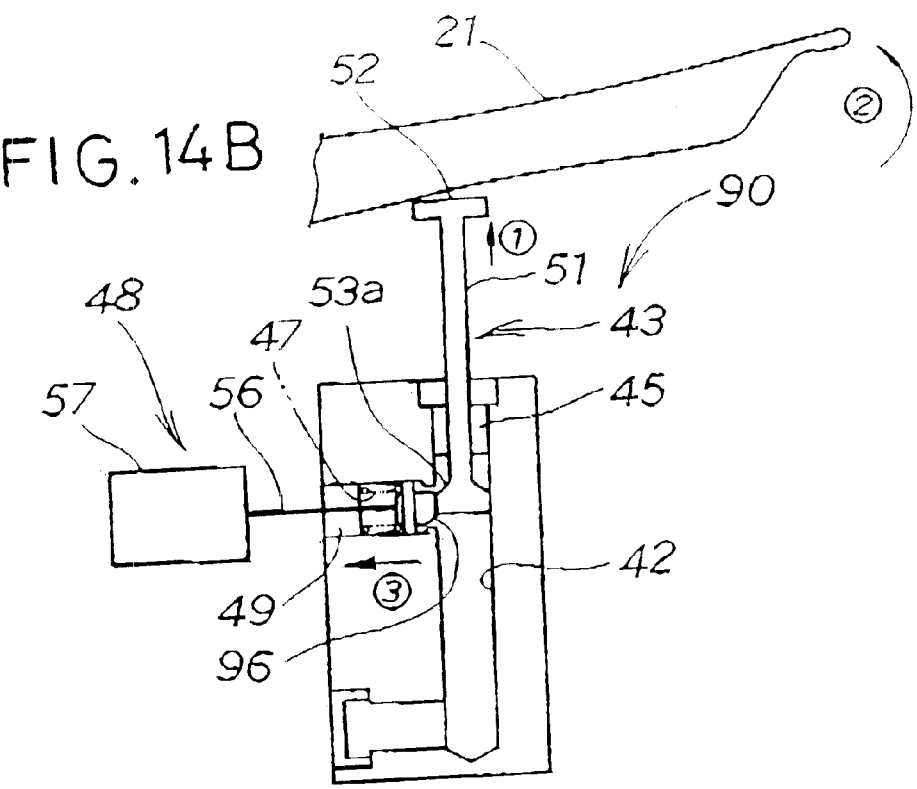
Figure 15A:
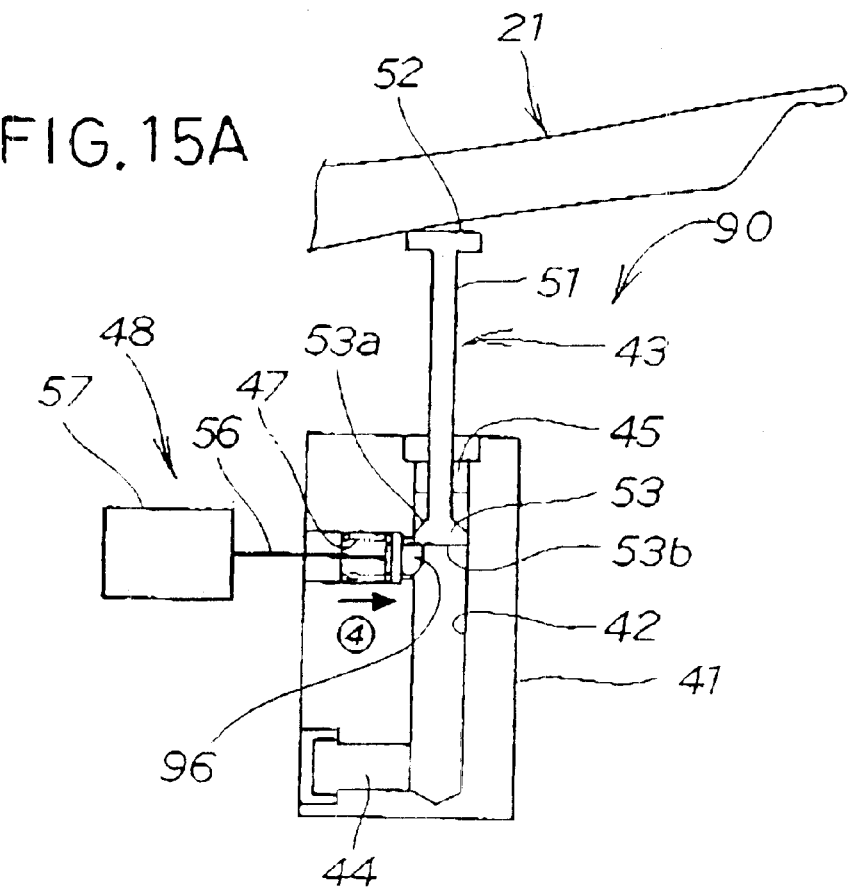
FIGS. 15A and 15B are another set of diagrams explaining the operation of the apparatus according to the third embodiment of this invention and showing the actuator in its position for holding a vehicle hood in its lifted position and in its position in which it is being retracted to its initial position, respectively.
Figure 15B:
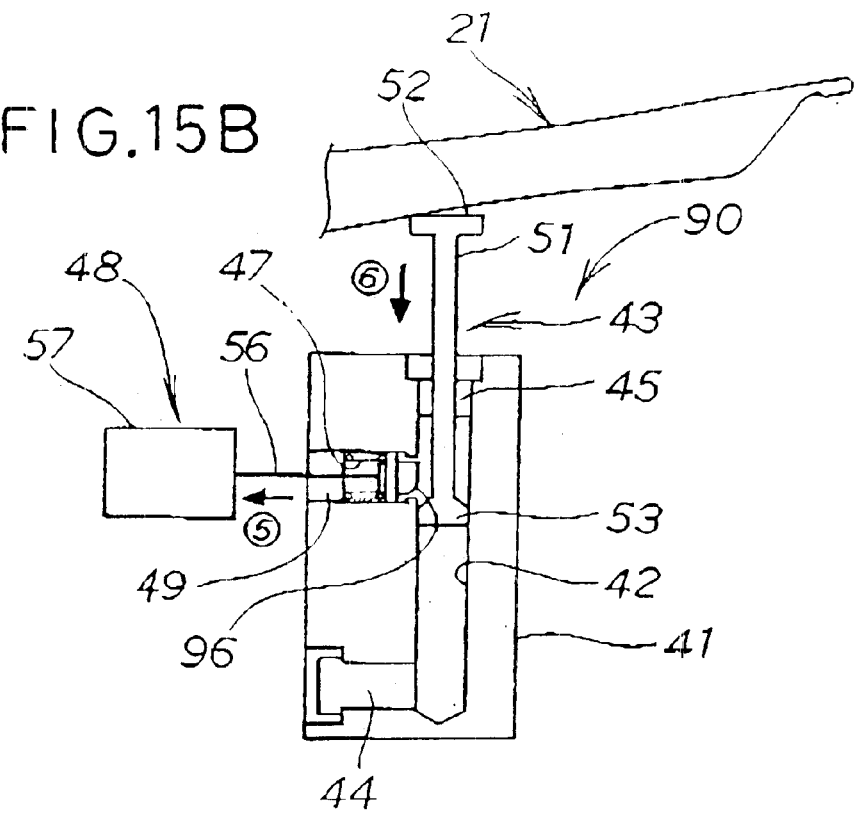

Description will now be made of the operation of the vehicle hood apparatus 80 with reference to FIGS. 14A and 14B showing the working sequence of each actuator 90 in a first half of the process of its operation and FIGS. 15A and 15B showing the working sequence of each actuator 90 in a second half thereof.

FIG. 14A and FIG. 14B show the first half operation of the apparatus 80 according to the third embodiment of this invention.

FIG. 14A shows the actuator 90 in its standby position in which the piston rod 43 stays within the cylinder 42, and the locking member 96 stays in its projected position. If the gas generator 44 is actuated upon detection of an object M (FIG. 11) by the sensor 23, the rod 43 is raised as shown by an arrow (1) in FIG. 14B to lift the vehicle hood 21 as shown by an arrow (2), while the tapered portion 53a of the piston 53 causes the locking member 96 to retract as shown by an arrow (3), so that the locking member 96 may not obstruct the upward movement of the piston pin 43.

The detection of the object M by the sensor 23 is also notified to the control device 91 to start the timer 92 therein, as shown in FIG. 11.

FIG. 15A and FIG. 15B show the second half operation of the apparatus 80 according to the third embodiment of this invention.

The upward movement of the piston pin 43 is stopped by the abutment of the piston 53 on the piston retainer 45, as shown in FIG. 15A. When the piston pin 43 is in its raised position, the piston 53 has its bottom 53b staying above the locking member 96 urged by the compression spring 47 to return to its projected position as shown by an arrow (4). The locking portion 96a of the locking member 96 stays under the bottom 53b of the piston 53 to lock the piston pin 43 in its raised position and thereby hold the hood 21 in its lifted position.

Upon passage of the time set by the timer 92 in the control device 91 (FIG. 11), the release unit 57 in the unlocking device 48 is actuated in response to information from the control device 91 to pull the connecting wire 56 in the direction of an arrow (5) in FIG. 15B to retract the locking member 96. The piston pin 43 is released from its locked position and lowered as shown by an arrow (6) by the weight of the object M (FIG. 11) on the hood 21, or of the hood 21 itself, so that the hood 21 returns to its original position.

The unlocking device 48 ensures that the hood 21 be lowered so as not to obstruct the sight of the driver if it is no longer necessary to hold the hood 21 in its lifted position as required for, say, protecting any structure within the hood 21 from any impact caused by an object M (FIG. 11) hitting the hood 21 and deforming it.

Figure 16:
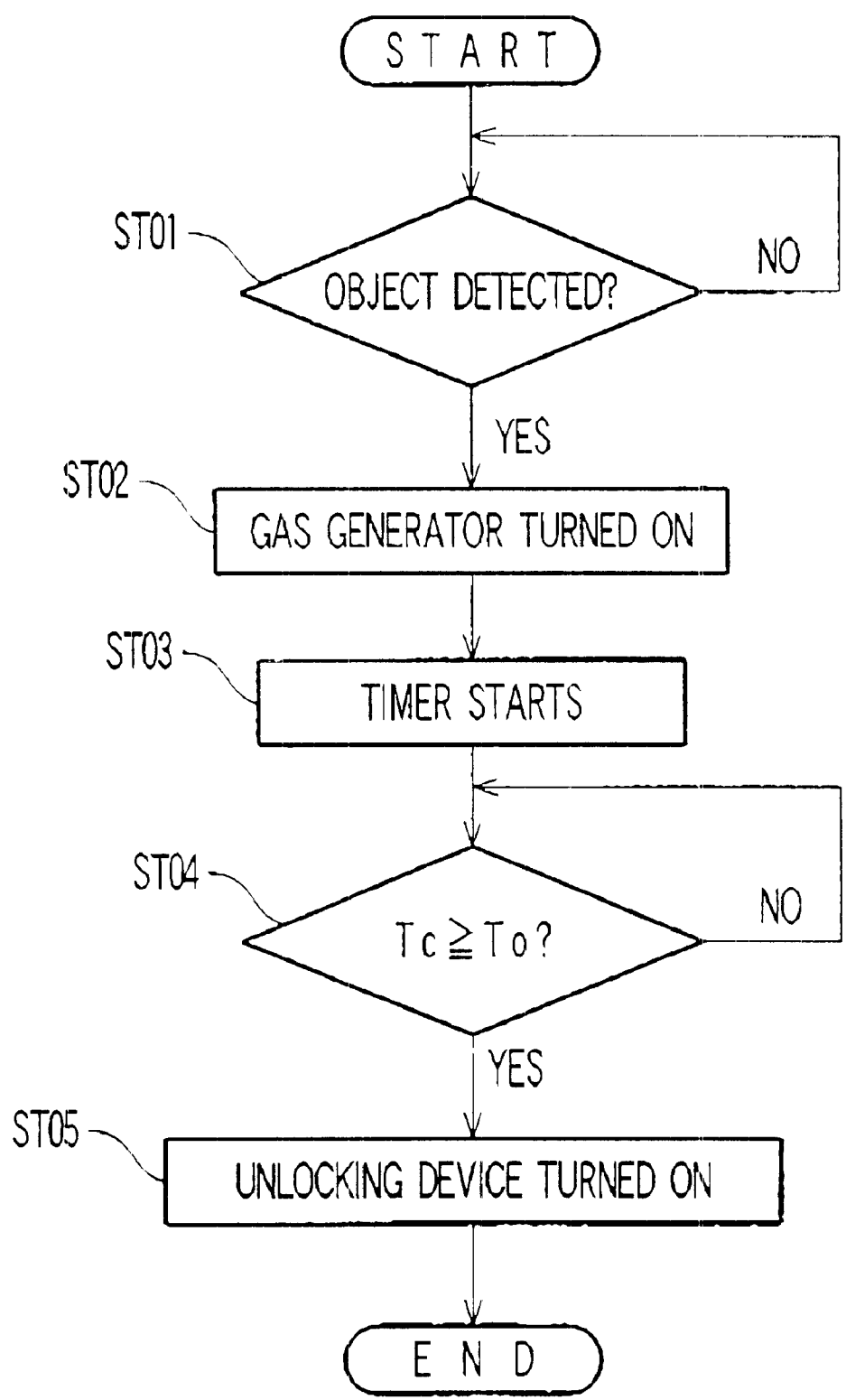
FIG. 16 is a flowchart showing a series of steps of operation of the apparatus according to the third embodiment of this invention.

FIG. 16 shows the second operation of the vehicle hood apparatus 80 according to the third embodiment of this invention in the order of Steps ST01 to ST05 (for the reference numerals, see FIGS. 11 and 12):

ST01—See if any object M has been detected by the sensor 23. If Yes, proceed to Step ST02, and if No, return to Start.

ST02—The gas generator 44 is turned on in response to information from the control device 91 to generate gas. The gas raises the piston pin 43 and the locking member 96 locks the piston pin 43 in its raised position.

ST03—The timer 92 in the control device 91 starts to count time.

ST04—See if the time Tc counted by the timer 92 has reached or exceeded the set time To (Tc≧To). If Yes, proceed to Step ST05 and if No, return to Step ST03.

ST05—The unlocking device 48 is actuated in response to information from the control device 92 to retract the locking member 96, whereupon the piston pin 43 is lowered by the weight of the object M on the hood 21, or of the hood 21 itself, and the hood 21 returns to its original position.

Obviously, various minor changes and modifications of the present invention are possible in the light of the above teaching. It is therefore to be understood that within the scope of the appended claims, the invention may be practiced otherwise than as specifically described.

What is claimed is:

1. A vehicle hood apparatus having at least one actuator for lifting a vehicle hood to an appropriate extent upon collision of an object with a vehicle, said actuator comprising:

an actuator block;

a cylinder defined within said block;

a piston pin extending into said cylinder through one end thereof;

a gas generator situated at the other end of said cylinder for raising said piston pin rapidly;

a piston retainer situated at said one end of said cylinder for retaining said raised piston pin in said cylinder;

a locking member capable of projecting into said cylinder for locking said piston pin in its raised position, said locking member having a front end, a back end opposite said front end, and a hole extending between said front and back ends to maintain an equal gas pressure therebetween; and an elastic member associated with said locking member for urging it resiliently to project into said cylinder, so that said hood may be lifted by said raised piston pin and held at its lifted position by said locking member.

2. A vehicle hood apparatus having at least one actuator for lifting a vehicle hood to an appropriate extent upon collision of an object with a vehicle, said actuator comprising:

an actuator block;

a cylinder defined within said block;

a piston pin extending into said cylinder through one end thereof;

a gas generator situated at the other end of said cylinder for raising said piston pin rapidly;

a piston retainer situated at said one end of said cylinder for retaining said raised piston pin in said cylinder;

a locking member capable of projecting into said cylinder for locking said piston pin in its raised position;

an elastic member associated with said locking member for urging it resiliently to project into said cylinder;

an unlocking device for retracting said locking member to release it from its locking action; and a control device for actuating said unlocking device in an appropriately timed relation to said locking member, so that said hood may be lifted by said raised piston pin and held at its lifted position by said locking member, while after a certain period of time, said locking member is released from its locking action to allow said hood to be lowered.

* * * * *